US009602381B1

(12) United States Patent
Jordan et al.

(10) Patent No.: US 9,602,381 B1
(45) Date of Patent: Mar. 21, 2017

(54) REAL TIME ADAPTIVE MONITORING

(71) Applicant: Amazon Technologies, Inc., Reno, NV (US)

(72) Inventors: Josiah William Jordan, Seattle, WA (US); Kenneth Hale Montanez, Seattle, WA (US); Bhupinder Singh Sidana, Kenmore, WA (US); Maksym Kovalenko, Newcastle, WA (US); Harshal Dilip Wanjari, Issaquah, WA (US); Ajay Mohan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 745 days.

(21) Appl. No.: 13/869,437

(22) Filed: Apr. 24, 2013

(51) Int. Cl.
*G06F 15/173* (2006.01)
*H04L 12/26* (2006.01)
*G06Q 10/08* (2012.01)

(52) U.S. Cl.
CPC ............ *H04L 43/16* (2013.01); *G06Q 10/08* (2013.01); *G06Q 10/0833* (2013.01)

(58) Field of Classification Search
None
See application file for complete search history.

(56) References Cited

U.S. PATENT DOCUMENTS

| | | | | |
|---|---|---|---|---|
| 6,535,129 B1* | 3/2003 | Petrick | ............... | G06K 17/0022 283/75 |
| 6,963,997 B2* | 11/2005 | Maly | ..................... | G06F 11/073 714/20 |
| 7,536,321 B2* | 5/2009 | Takahashi | ............ | G06Q 10/063 705/330 |
| 8,150,705 B2* | 4/2012 | Walls | ..................... | G06Q 10/08 382/101 |
| 8,346,675 B2* | 1/2013 | Boerkei | ................. | G06Q 10/08 235/385 |
| 2004/0243452 A1* | 12/2004 | Barton | ................... | G06Q 10/08 705/337 |
| 2004/0260474 A1* | 12/2004 | Malin | ................... | H04L 41/069 702/6 |
| 2010/0082151 A1* | 4/2010 | Young | .................... | G06Q 10/08 700/226 |
| 2011/0060948 A1* | 3/2011 | Beebe | .................... | H04L 43/16 714/37 |

\* cited by examiner

*Primary Examiner* — Thomas Dailey
(74) *Attorney, Agent, or Firm* — Athorus, PLLC

(57) ABSTRACT

This disclosure describes systems and methods for dynamically and automatically adapting the level of data logging that occurs within a network of nodes, identifying causes of exceptions that occur within the network and resolving those causes to ensure that the network continues operating efficiently. A monitoring service may automatically increase/decrease data logging of various nodes within the network as it progresses through levels of a network searching for a node that is the source of a cause of an exception. Once identified, the monitoring service may process the logged data and either automatically resolve the cause of the exception or provide information to an operator for resolution.

24 Claims, 7 Drawing Sheets

REAL TIME ADAPTIVE MONITORING

BACKGROUND

With the continued growth and use of computing systems in our environment there is an ever increasing amount of data that is available for collection and logging that can be used to ensure systems run as expected and to diagnose problems when they arise. However, with the vast array of data available, constantly collecting all of the data places an unnecessary burden on the computing systems, sacrificing performance and wasting memory. In comparison, if you do not log any data, you may not be able to identify and/or resolve problems when they arise. Current systems allow operators to manually adjust the amount of data that is logged for various activities, events and operations. For example, some systems allow operators to select the level (e.g., minimal, average, maximum) of data that is logged. Operators may manually adjust the level of data logging depending on the activities of the system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
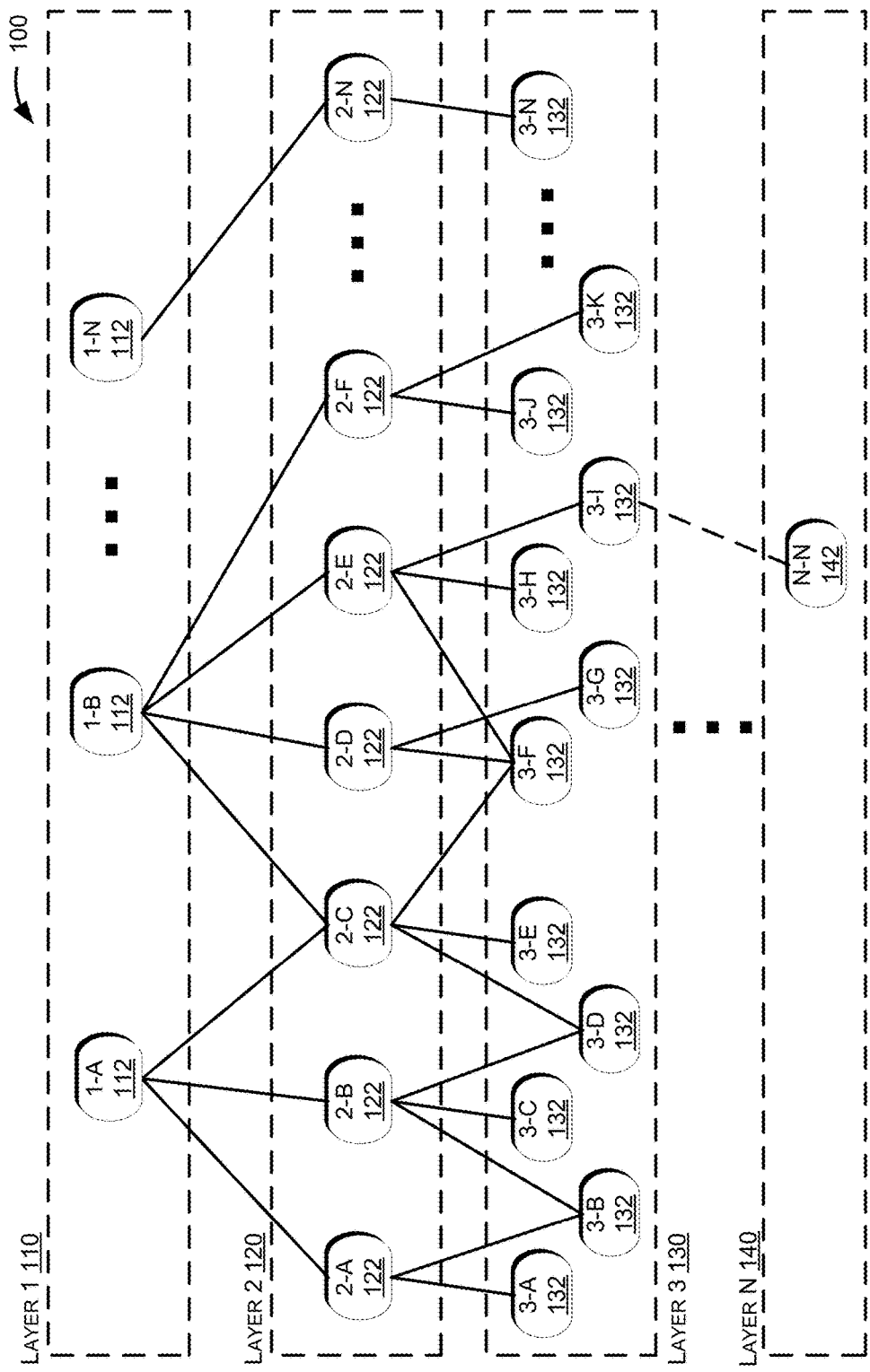
FIG. 1 illustrates a block diagram of a layered network, according to an implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes systems and methods for dynamically and automatically adapting the level of data logging that occurs within a network of nodes, identifying causes of exceptions that occur within the system and resolving those causes to ensure that the network continues operating efficiently. In one implementation, the network may be distributed into multiple levels, each level providing an additional layer of granularity into the network. Nodes at each level may be monitored and exceptions may be reported between nodes. For example, a child node (aka lower layer node) may report an exception up to a parent node (or higher layer node). This reporting of exceptions may continue up to the highest layer.

A monitoring service may monitor for events occurring within the network that need to be resolved. For example, if the network is a fulfillment network, an event may be a determination that a customer's package is not going to be delivered to the customer by the promised delivery date. This event, while not specific to any node within the network is potentially being caused by one or computing resources within the network. For example, one of the computing resources may not be configured properly, a data store commit or insert may fail, causing an exception, a hardware failure may occur, etc. Any one of these causes may result in the package not progressing through the network as expected and thereby not being delivered to the customer by the promised delivery date.

For example, if a picking agent within the fulfillment network has picked the customer's ordered items for packing but the scan of the items from the inventory shelf to the agents cart or tote does not record into the data store (a data store commit exception) the items may not properly be delivered to packing.

To identify the source of the cause of an exception within the network, a monitoring service may query the top level nodes in the network to identify any exceptions. Once a top level node with an exception is identified, the monitoring service may cause the child nodes reporting to that node to automatically increase the amount of data that is being logged for services of those child nodes.

In addition, the monitoring service may progress to the next level within the network related to the parent node that is reporting an exception, process the logged data to identify a node(s) at the second level that is reporting an exception. Once a node at the second level that is reporting an exception has been identified, the logging of data at the other nodes in that level and the child nodes that are not connected to the identified node may automatically be terminated or returned to a normal state of data logging.

This process of progressing down a level, identifying a node that is reporting an exception and reducing/terminating the logging of data at non-exception reporting nodes may continue through the levels of the network until the node that is the source of the cause of the exception is identified.

Once the node that is the source of the cause of the exception is identified, the logged data for that node is analyzed to determine the cause of the exception and steps are taken to correct the cause of the exception. In some implementations, the cause of the exception may be automatically resolved. For example, if the cause of the exception is insufficient memory, the monitoring service may allocate additional memory to the data store to thereby enable a data store commit or insert to successfully complete.

In other implementations, the cause of the exception may require manual intervention to resolve the exception. For example, if the cause of the exception is non-existence of a table to which a commit is made, or a field missing from a data store, manual intervention may be necessary to resolve the exception.

Once the exception has been resolved, the monitoring service may continue monitoring the node to verify that the exception has been resolved. Once the resolution is verified, the logging of data at the node that was identified as the source of the cause of the exception may be automatically reduced or terminated and the monitoring service may go back to monitoring the network for events.

By monitoring a network for events and then iteratively processing through various layers of the network, automatically increasing/decreasing logging as the service progresses through each layer allows the necessary data to be logged without overburdening the system. In addition, the implementations described herein also allow for many causes to be automatically resolved without operator intervention or involvement.

The monitoring service may be implemented in any distributed computing environment and the implementation within a fulfillment network is only provided as an example to assist in discussion—as such it should not be considered as limiting. Other example utilizations include cloud computing environments, multi-level data store networks, transportation networks, military networks, police networks, or any other network where communication between nodes occurs.

FIG. 1 illustrates a block diagram of a layered network, according to an implementation. The layered network 100 of FIG. 1 includes N layers 100, 120, 130, 140 and each layer may have one or more nodes that are connected or otherwise in communication (e.g., wired and/or wireless). In one implementation nodes of layer 1, such as node 1-A 112 is in communication with and connected with, for monitoring purposes, only nodes of its child layer, layer 2 120. In other implementations, nodes within a same layer may also be connected to and in communication with other nodes within that same layer. In this example, layer 1 110 includes nodes 1-A 112, 1-B 112 and 1-N 112. Layer 2120 includes N number of nodes as well. In this example, layer 2 120 includes nodes 2-A 122, 2-B 122, 2-C 122, 2-D 122, 2-E 122, 2-F 122 and 2-N 122. Layer 2 130 also includes N number of nodes 132. Likewise, as there may be any number of nodes within each layer, the distributed network that may be utilized with the implementation as described herein may have N number of layers, as illustrated by N-140. Nodes within each layer may communicate with other nodes in that layer, parent nodes, and/or child nodes. For example, layer 3 130 node 3-A 132 may communicate with its parent node in layer 2 120. In this example, the parent node in layer 2 120 for node 3-A 132 is node 2-A 122. If node 3-A 132 is experiencing an exception, such as a data store commit failure or insert failure it may report the exception to its parent node. Likewise, the reporting of each exception may continue up through each layer until it reaches the parent node in the top layer, in this example parent node 1-A 112 of layer 1110.

Many different configurations of the network may be envisioned with the implementations described herein. For example, in some implementations each parent may monitor and/or communicate with one or more child nodes but each child node may only communicate with one parent (a many-to-one parent child relationship structure). In other implementations, each parent may communicate and monitor multiple child nodes and each child may have multiple parent nodes (a many-to-many parent child relationship structure). While the example illustrated in FIG. 1 is that of a layered tree of nodes, in other implementations the network may be organized as a graph, which may include multiple relationships between nodes (many-to-many) and the network may be traversed in a graph manner utilizing the implementations discussed herein.

Nodes within the network may be distributed geographically, may all be located in the same facility or any combination thereof. In general, nodes of various layers may be completely independent provided that there is a form of communication, such as wired or wireless communication between child and parent nodes. In general, layer 1 nodes are high level nodes representing a high level picture of the network. Each successive layer provides another level of granularity into the network. For example, continuing with the discussion of a fulfillment center network, the layer 1 110 nodes may represent the various fulfillment centers within the network, the manufacturing facility from which items are obtained, the shipping carriers, and/or the customers that order and receive items.

Figure 2:
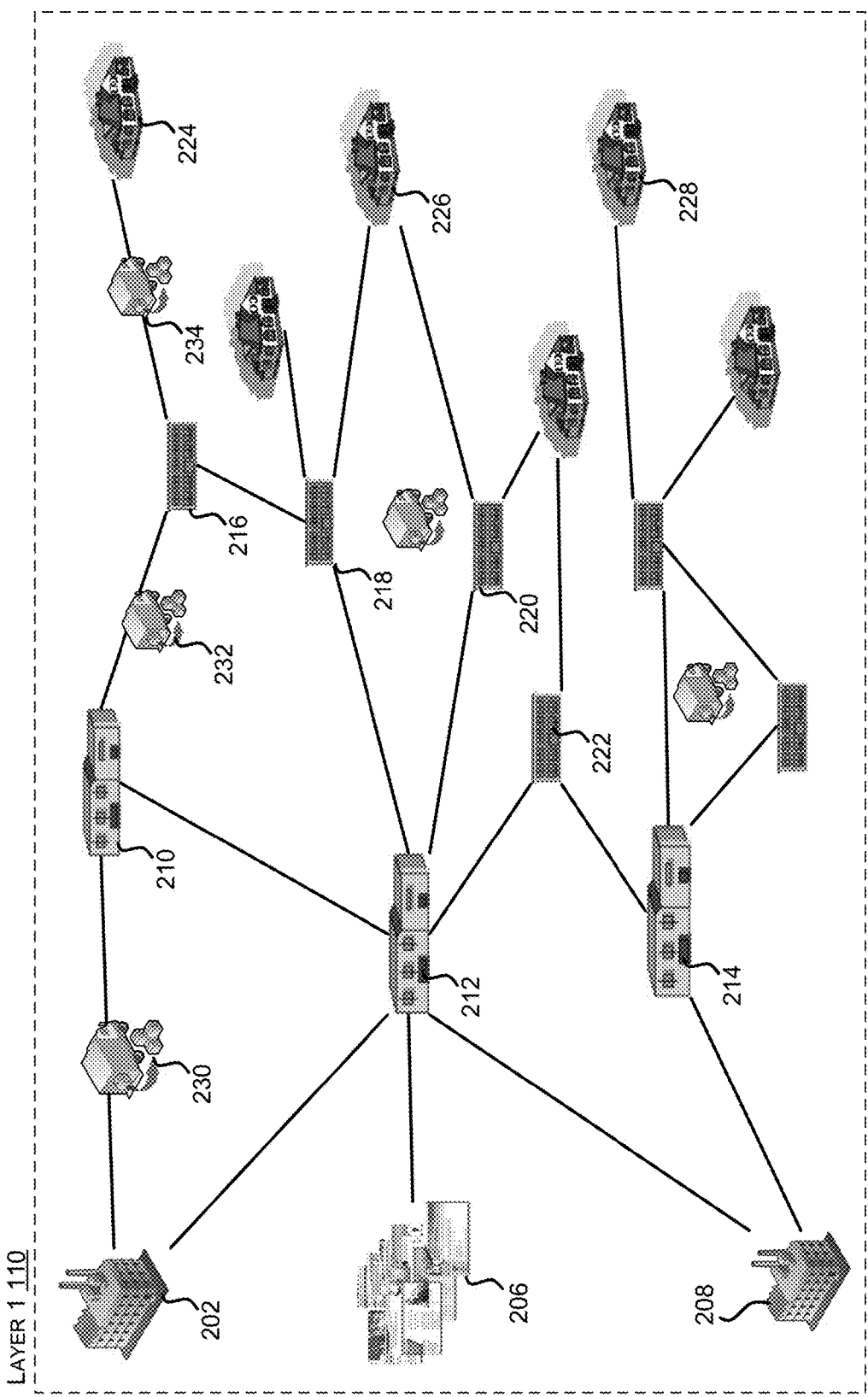
FIG. 2 illustrates a block diagram of nodes within layer 1 of the layered network illustrated in FIG. 1, according to an implementation.

The layer 2 120 nodes of a fulfillment center network may represent nodes within a specific fulfillment center of the network, as illustrated in FIG. 2. For example, if node 1-A 112 represents a fulfillment center located in Dallas, Tex., the child nodes in layer 2 connected with parent node 1-A 112 may represent the different stages within that fulfillment center, as discussed below with respect to FIG. 3. Likewise, the nodes of layer 3 130 may represent yet another level of detail into the distribution network within that fulfillment center. For example, the child nodes illustrated in layer 3 130 may be the specific resources, services or operations offered by the parent node, as discussed below with respect to FIG. 4.

Continuing with the above example, FIG. 2 illustrates a block diagram of nodes within layer 1 110 of a fulfillment network, according to an implementation. As can be seen from the block diagram of FIG. 2 the layer 1 110 nodes of a fulfillment network may include the manufacturing facilities 202, 208 that manufacture and deliver items to the fulfillment centers within the network. Likewise, the layer 1 110 nodes may also include the location from which customers may purchase and order items, such as a website 206.

Within layer 1 110 of the fulfillment network there may be numerous materials handling facilities, 210, 212, 214 as well as numerous distribution centers 216, 218, 220, 222. Likewise there may be any number of customer locations 224, 226, 228 that receive orders of packages of items from those distribution centers 216, 218, 220, 222. In addition to the physical facilities of the layer 1 nodes, in some implementations the layer 1 nodes may also include the transportation systems 230, 232, 234 that transport items between nodes of layer 1110.

While in this example the providers 202, 208 of the items and the transportation providers 230, 232, 234 as well as the customers, 224, 226, 228, are part of the nodes of layer 1 110, in other implementations those features may not be included in the distributed network monitored by the monitoring service. As can be appreciated, at each node within each layer, numerous operations may occur that may not typically be logged. For example, transition of a package from a materials handling facility to a transportation provider may occur between nodes of layer 1 and such transition may be recorded in a database. Such an operation and other operations may occur with high frequency between nodes and a log of such operations may not normally be recorded.

In some implementations, the monitoring service may continually monitor the network for an occurrence of an event. A series of monitoring thresholds may be maintained by the monitoring service and an event considered to occur when one or more of those thresholds are exceeded. For example, a promise date delivery monitoring threshold may be maintained that is monitored to determine whether a promised delivery date may not be satisfied for one or more customer orders. For example, if a customer orders an item for delivery and the customer receives a deliver by promise of three days, the customer's order may be monitored within the fulfillment network and a probability determined as to whether the ordered items will be delivered by the promised delivery date. The threshold may represent a probability as to whether those items will be delivered by the delivery date. For example, if the monitoring threshold is 50%, and a determination is made based on the progress of the fulfillment of those items to the customer such that there is only a 45% probability the items will be delivered on time, the monitoring threshold may be exceeded, which may be considered an event by the monitoring service.

Upon event identification, the monitoring service queries each of the layer 1 nodes to identify which of those nodes are reporting an exception. Continuing with the above example, if fulfillment center 212 is reporting an exception, the monitoring service may identify fulfillment center 212 as the top level node that is potentially the source of the cause of the problem that has resulted in the event occurring. In some implementations, the monitoring service may not query every layer 1 node. In contrast, the monitoring service may determine which layer 1 nodes are related to the event and only query those nodes for an event. For example, if the package is to be shipped to the customer 226 from fulfillment center 212 via distribution center 220, the monitoring service may only query those top level nodes for exceptions, as they are the only nodes in the path of the customer's order.

Upon identifying the top level node 212 as the potential source, each child node that is in communication with the top level node 212 may be instructed to automatically increase the logging of data for the events, services and/or operations at each of those respective nodes. Upon increasing the logging of data at each of the child nodes, the monitoring service may progress to layer 2 120 of nodes and continue processing until the source of the cause of the event is identified.

Figure 3:
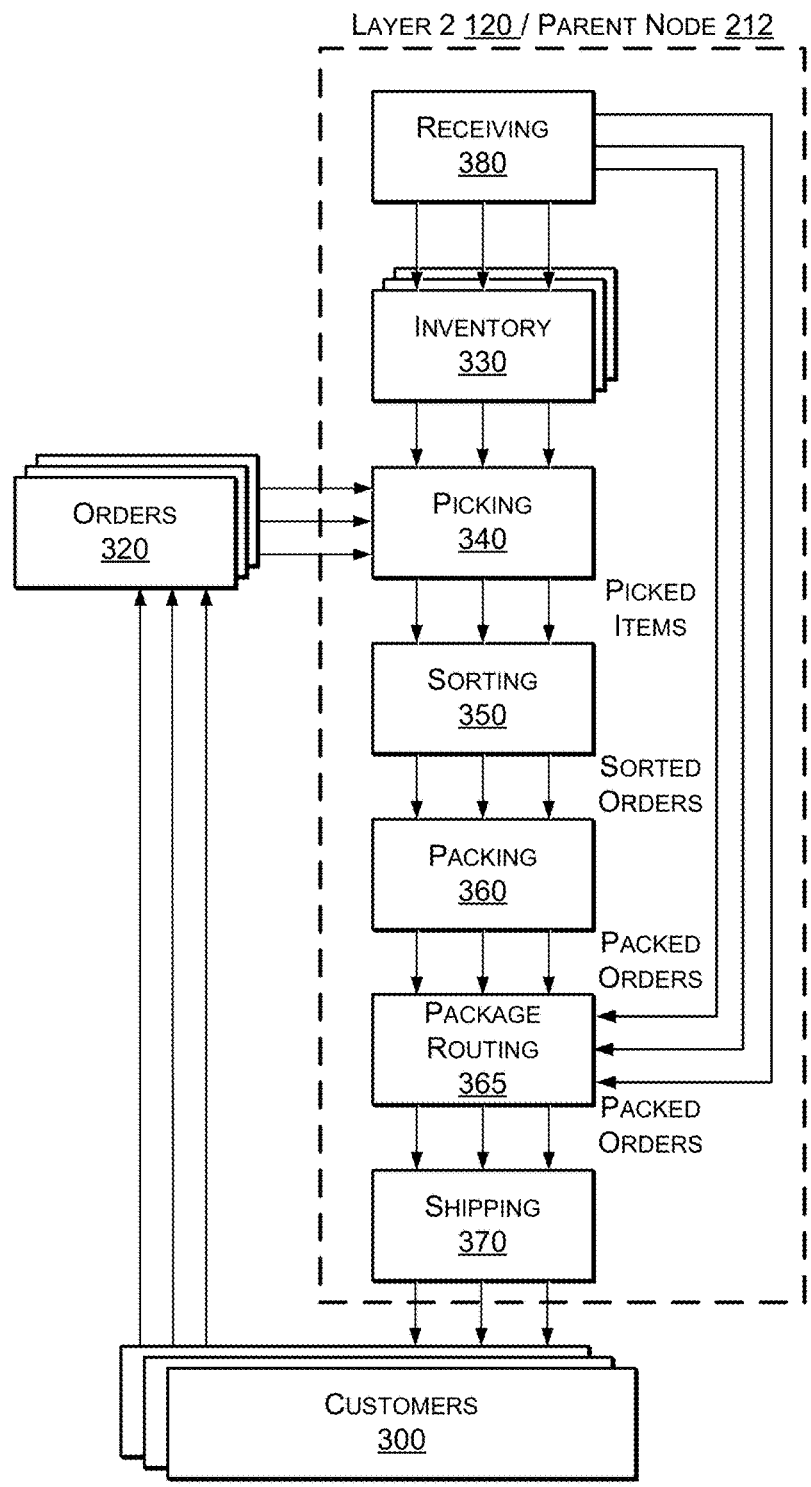
FIG. 3 illustrates a block diagram of nodes within layer 2 of the layered network illustrated in FIG. 1, according to an implementation.

For example, the layer 2 120 nodes for fulfillment center 212 may be the various services and/or operations within the fulfillment center 212. FIG. 3 illustrates a block diagram of a materials handling facility and the services/operations of that fulfillment center, in accordance with an implementation.

In this example, multiple customers 300 may submit orders 320, where each order 320 specifies one or more items from inventory 330 to be shipped to the customer or to another entity specified in the order. An order fulfillment facility typically includes a receiving operation 380 for receiving shipments of stock from various vendors and storing the received stock in inventory 330. To fulfill the orders 320, the item(s) specified in each order may be retrieved or "picked" from inventory 330 (which may also be referred to as stock storage) in the order fulfillment facility, as indicated by picking operation 340. When an item is picked the operation of recording the picking of the item from an inventory location by an agent may be recorded in a database. As will be appreciated, in a busy order fulfillment facility, picking operations may occur with a very high frequency.

Picked items may be delivered to one or more stations in the order fulfillment facility for sorting 350 into their respective shipment sets and for packing 360. A package routing operation 365 may sort packed orders for routing to one of two or more shipping operations 370, from which they may be shipped to the customers 300. The package routing operation 365 may in various implementations be automated or manual. The package routing operation 365 may receive an indication of the destination to which each packed order should be routed from a central control system.

Like a picking operation, each time an item transitions between operations within the order fulfillment facility, such as between package routing operation 365 and shipping operations 370, the operation may be recorded in a database to allow for tracking of the item as it progress through the order fulfillment facility. In addition, in some order fulfillment facilities, operations, such as routing operations may route different items and/or package to different locations depending on the item/package that is being routed. For example, the routing operation 365 may route the picked or sorted items to a particular packing station 360 depending upon the size or type of the packaging into which the items are to be packaged. For example, not all shipping packages utilized in the facility may be available at all of the packing stations 360. Similarly, some packing stations 360 may not have access to protective materials recommended for shipping fragile items or items for which additional protection may be appropriate. Therefore, if a shipment set requires special packaging, a routing operation may be configured to direct the item(s) to a packing station 360 at which an appropriate shipping package and/or protective materials are available.

Each of the operations 330, 340, 350, 360, 365, 370, 380 may be supported by one or more computing resources, such as the central control system, that record progress of events and/or operations through the order fulfillment facility and provide instructions. For example, a picking agent may receive instructions to pick and item from an inventory location and transport that item to sorting 350. As noted above, as part of that operation, the picking agent may scan the item and/or the cart into which the item is being placed for transport. The scanned information is provided to the computing resource and stored in a data store. If the commit to the data store fails, it may cause an exception to occur.

As used herein, the term "data store" refers to any device or combination of devices capable of storing, accessing and retrieving data, which may include any combination and number of data servers, databases, data storage devices and data storage media, in any standard, distributed or clustered environment. A data store may include several separate data tables, databases or other data storage mechanisms and media for storing data relating to a particular aspect.

The arrangement and order of operations illustrated by FIG. 3 is merely one example of many possible implementations of the operation of a materials handling facility, such as an order fulfillment facility. Other types of materials handling, manufacturing, or order fulfillment facilities may include different, fewer, or additional operations and resources, according to different implementations.

When an exception if found at one of the nodes within layer 2 120, such as the picking 340 node of FIG. 3, the increased logging of other nodes in that layer may be reduced or returned to a normal state of logging. The monitoring system may then process the logged data at the node with the exception to determine if that node is the source of the cause of the exception. If the node is not the source of the cause of the exception, the monitoring service may progress to the next layer child nodes. In this example, the monitoring service may progress to the child nodes of picking 340, as discussed below in FIG. 4.

Figure 4:
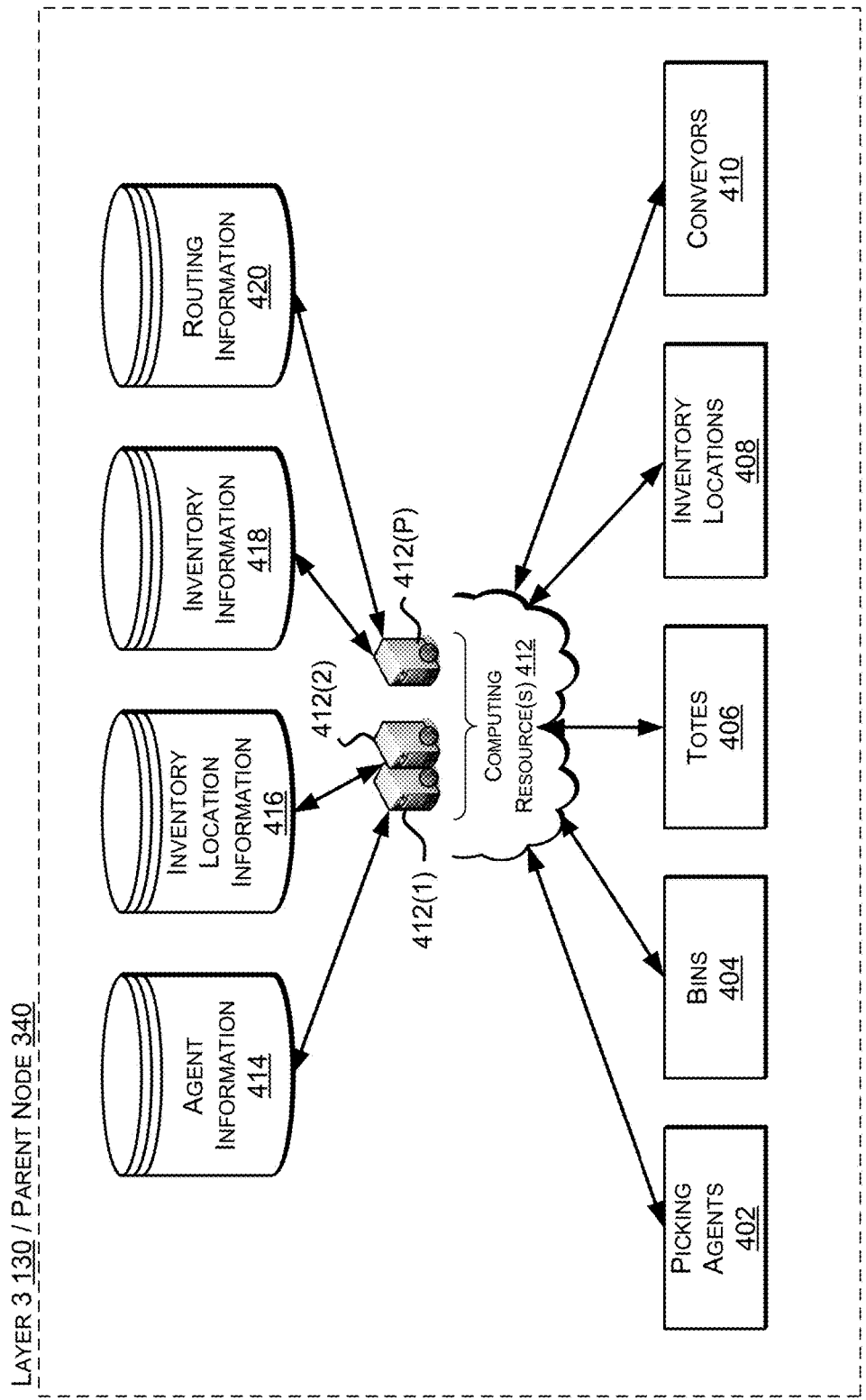
FIG. 4 illustrates a block diagram of nodes within layer 3 of the layered network illustrated in FIG. 1 and their computing resources, according to an implementation.

FIG. 4 illustrates a block diagram of child nodes within layer 3 that are the child of parent node, picking 340, of the layered network, according to an implementation. As illustrated in FIG. 4, each of the nodes of layer 3 that are part of picking may include picking agents 402, bins 404, totes 406, inventory locations 408, conveyors 410. As with the other layers, any number of nodes may be part of this child layer 3 130. In addition, as illustrated in FIG. 4, each of the nodes 402 through 410 may be controlled by a central control system, which may be implemented as computing resources 412. The computing resources 412 may be local to the materials handling facility, remote from the materials handling facility, or any combination thereof. Likewise, the computing resources 412 may be configured to communicate over a network with the different nodes within the network.

As illustrated, the computing resources may be remote from the materials handling facility and implemented as one or more servers 412(1), 412(2), . . . , 412(P) and may, in some instances form a portion of a network-accessible computing platform implemented as a computing infrastructure of processors, storage, software, data access, and so forth that is maintained and accessible via a network such as the Internet. The computing resource(s) 412 do not require end-user knowledge of the physical location and configuration of the system that delivers the services. Common expressions associated for these remote computing resource(s) 412 include "on-demand computing," "software as a service (SaaS)," "platform computing," "network-accessible platform," "cloud services," "data centers," and so forth.

Computing resources 412 support interaction with the various nodes 402 through 410. Likewise, the computing resources 412 may store information in one or more data stores, such as agent information data store 414, inventory location information data store 416, inventory information data store 418, and routing information data store 420.

As can be seen in this example, any one of the nodes may be the source of the cause of the exception. For example, if the picking agents 402 are attempting to scan an item that is being transitioned from an inventory location 408 to a bin 404 and the scan is not being recorded in a data store it may be determined that any of the picking agent node 402, bin 404, or inventory location 408 is the source of the cause of the exception. In this example, it may be determined that the picking agent 402 is the source of the cause of the exception because the picking agent is attempting to complete a commit to the data store of the computing resource 412 to transition the inventory item from an inventory location to a cart. For example, if the picking agent is not authorized to record information into the inventory location information data store 416 of the computing resources 412 an exception occurs that is reported up to the top level node.

As the monitoring service progresses through the network and identifies the node that is the source of the cause of the exception it releases/terminates logging of non-exception reporting nodes at each level. This process allows the monitoring service to record data for the relevant exception that can be used to determine the cause of the exception without placing an unnecessary burden on nodes that are not a source of the cause of the exception. Once the node that is the source of the cause of the exception is identified, in this example, the picking agent 402, the logged data may be analyzed to determine the cause of the exception and steps are taken to resolve the cause. In this example, the cause of the data store commit failure (exception) is that the picking agent does not have authorization to commit a change to the data store.

In some implementations, the cause, once determined, may be automatically corrected. In other instances, the logged data, the identified cause of the exception and an identification of the node that is the source of the cause of the exception may be provided to an operator for resolution. Once the cause of the exception is resolved, the monitoring service may continue monitoring the affected node to verify that the exception is resolved. Once verified, the data logging for the node may return to a normal state. In some implementations, logged data may be removed from memory once it is determined to not be needed. For example, when a node is allowed to transition back to a normal state of data logging, or to terminate data logging, the logged data may be removed from memory.

Figure 5:
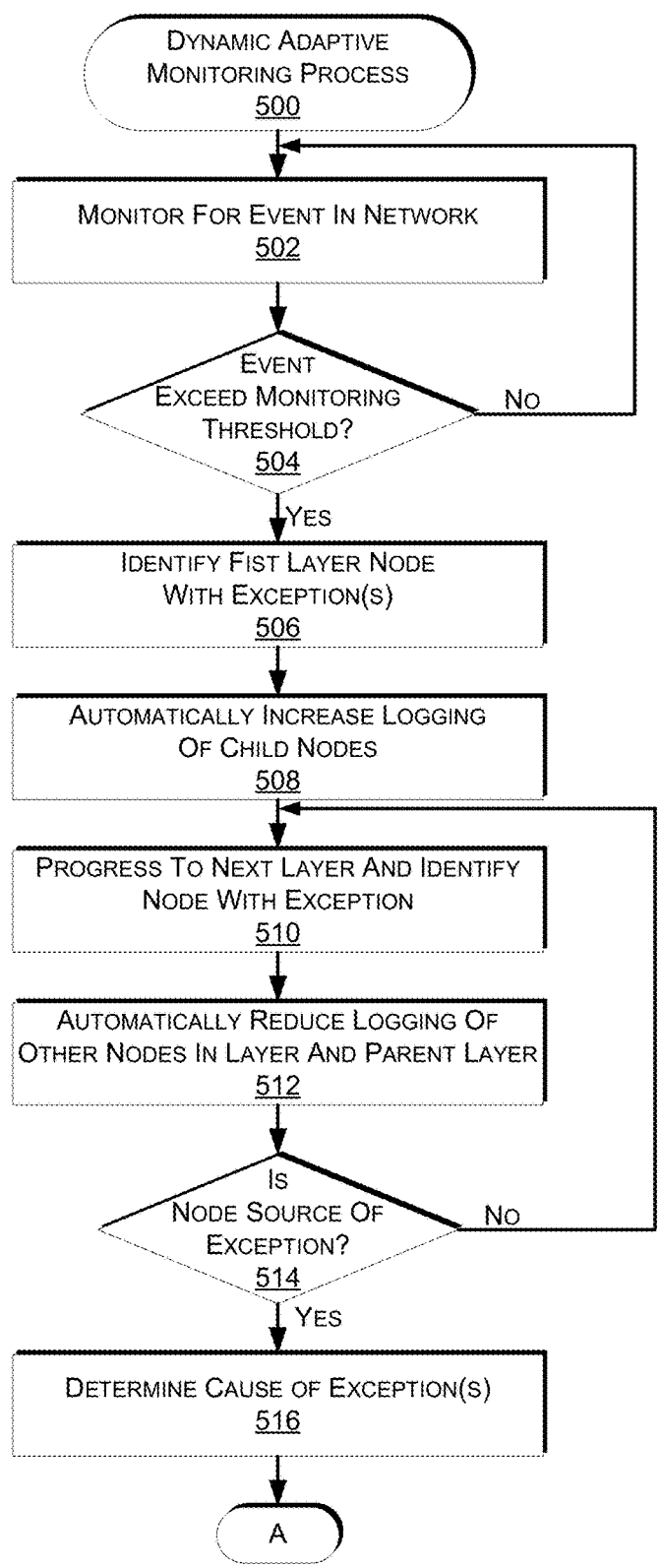
FIGS. 5-6 are a flow diagram illustrating an example process for automatic adaptive monitoring, according to an implementation.
Figure 6:
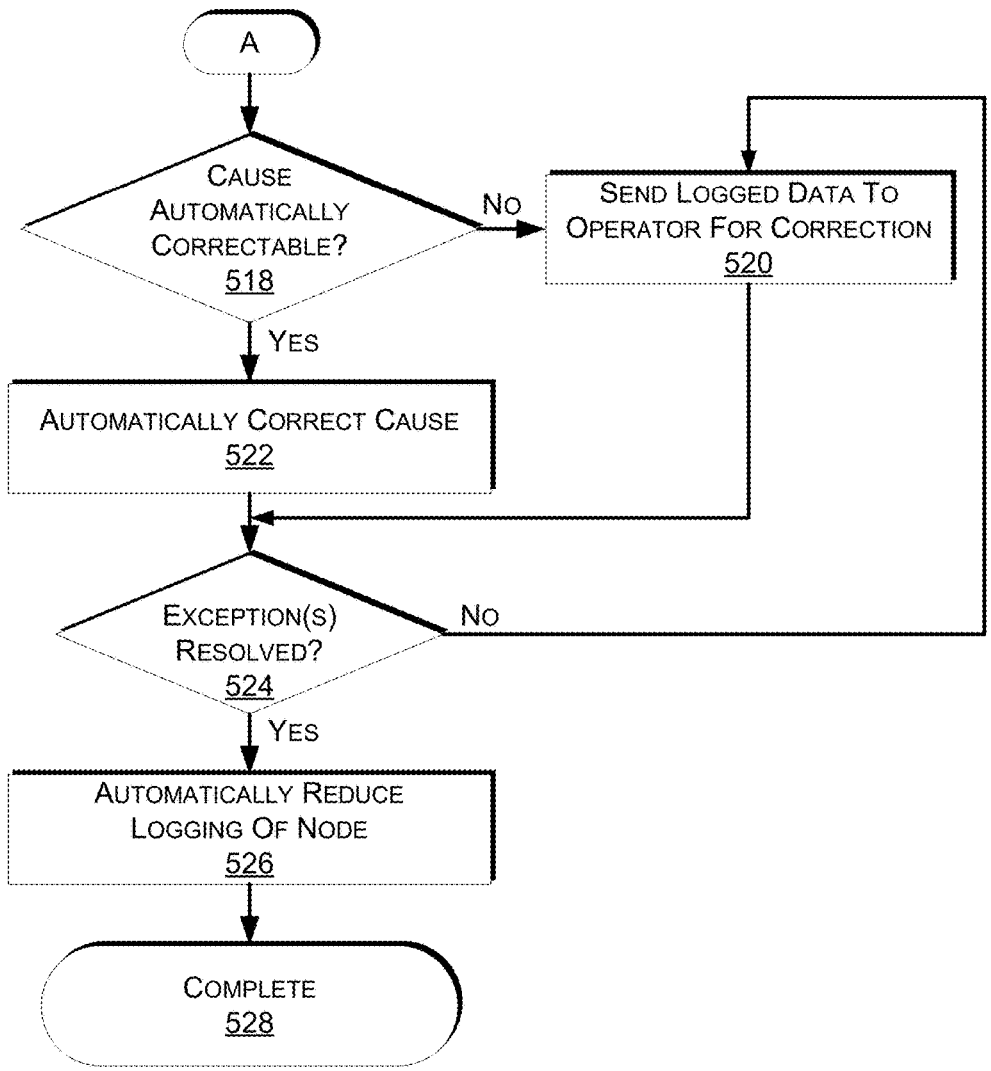

FIGS. 5-6 is a flow diagram illustrating an example process 500 for dynamic adaptive monitoring, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process.

The example process 500 begins by monitoring for an event within the network, as in 502. An event may be any behavior that is monitored to ensure that the network continues operating as desired. For example, if the network is a fulfillment center network, the delivery of items to customers through that network according to a predetermined schedule may be monitored and when the schedule is likely not going to be satisfied an event may be identified. As another example, if the network is a cloud computing network the rate at which data is processed using one or more of the computing nodes within the cloud computing network may be monitored and if an estimated completion time is not satisfied, an event may occur.

Regardless of the type of event that is identified in the network, a determination may be made as to whether the event exceeds a monitoring threshold, as in 504. A monitoring threshold may be any threshold or identifier for determining whether the event is of a severity of such that additional data logging needs to be recorded and a source of the cause of event identified. In some implementations, the threshold may be zero such that the occurrence of any event within the network may result in the remaining portion of the process 500 being completed. In other implementations, the threshold may be set at any predetermined level for monitoring for events. In still other examples, the monitoring threshold may dynamically adjust based off the occurrence of other events or the severity of the event that has been identified. For example, during high usage periods, the monitoring threshold may be set to a lower amount such that a minimal event may trigger the remainder of the monitoring process 500 to complete. In other implementations, during high usage periods the monitoring threshold may be increased so as not to unnecessarily burden the computing devices of the network with additional data logging.

If it is determined that the monitoring threshold has not been exceeded, the example process 500 returns to block 502 and continues monitoring the network for an occurrence of an event. However, if it is determined that the monitoring threshold has been exceeded, the example process 500 identifies a first layer node within the network that is reporting an exception, as in 506. An exception may be any failed or unexpected activity that is occurring within the network. For example, an exception may be the result of a commit or insert to a data store that has failed, a lack of communication between nodes, to many requests received, power outage, or any other deviation from normal operation. Likewise, in some instances the event may be the exception. For example, the event may be a lack of communication form a node and the exception may also be a lack of communication from a node. In such an example, it may be determined that the cause of the exception is a hardware failure.

Upon identifying a first layer node that is reporting an exception, the logging of data of all child nodes that are communicating, either directly or indirectly with the identified first layer node may be increased, as in 508. In some implementations, all nodes within the network that eventually report up to the first layer node may have their logging of data automatically increased. In other implementations, only the immediate layer beneath the first layer node may have its logging automatically increased. In still other implementations, multiple but not all of the layers beneath the first layer node may have data logging automatically increased.

In addition to increasing the logging of data of the child nodes, the example process 500 progresses to the next layer, such as layer 2, and identifies a node within that layer that is reporting an exception, as in 510. Once a node within the layer is identified that is reporting an exception, the other nodes in that layer may have their increased logging either reduced to the normal logging level of terminated back to the normal state of operation, as in 512. Automatically reducing the logging of data for the nodes within the layer that are not reporting exceptions reduces the amount of load on those nodes and allows them to return to normal network operation levels. In addition to reducing or terminating the logging of other nodes in the layer under review, the child nodes of non-exception reporting nodes may also have their logging automatically reduced, as they are not in the chain of the exception that is potentially causing the event.

The example process 500 may analyze the logged data at the node that is reporting the exception to determine if the node is the source of the cause of the exception, as in 514. In some implementations, this may be done by simply looking to see if the node is itself reporting an exception or if it is receiving a notification of an exception for a subsequent child node. In other implementations, the example process 500 may query the data that is being logged by the node to determine if there are any exceptions being recorded and a potential cause of those exceptions. If it is determined that the node is not the source of the exception, the example process 500 returns to block 510 and continues through each layer of the network until a node that is reporting an exception is identified as the source of the cause of the exception.

Once the node that is the source of the cause of the exception is identified, the cause of the exception itself is determined, as in 516. The cause of the exception may be determined by processing the logged data for that node. For example, the cause of the exception of a commit or insert to a data store failing may be that there is insufficient data store memory, an unauthorized user request, an incorrect data field in the data store, a hardware failure, a connectivity failure, etc. Other examples include, but are not limited to, a missing field in the data store, the data store has changed during the processing such that a commit cannot be recorded, etc. Regardless of the cause of the exception, for the example process 500 to take meaningful action it is desirable to know both the node in which the exception occurred and the cause of the exception.

Moving on to FIG. 6, once the cause of the exception has been determined, a determination may be made as to whether the cause of the exception can be automatically corrected, as in 518. As discussed above, some exceptions can be automatically corrected. For example, if there is insufficient memory, the data store needs to be extended, or there is a hardware problem with the node itself, automatic steps may be taken to correct the cause of the exception, as in 522. For example, if there is insufficient memory, the example process 500 may allocate additional memory and/or computing resources to the data store such that the exception can be resolved. Likewise, if there is a hardware problem with the node, the example process 500 may be capable of provisioning another node and reallocating the data store to the newly provisioned node so that the exception is resolved.

If it is determined that the cause of the exception cannot be automatically corrected, the data logged by the node and the identified cause of the exception may be sent to an operator for correction, as in 520.

After automatically correcting the cause of the exception at block 522 or upon operator correction of the cause of the exception at block 520, the example process 500 may continue monitoring and logging data of the node and a determination may be made to verify whether the exception has been resolved, as in 524. If it is determined that the exception has not been resolved, the example process 500 returns to block 520 and continues. While the example process 500 illustrates that if it is determined that the exception has not been resolved, the process returns to block 520. However, rather than routing all determinations that the exception was not resolved, in some implementations, the process may return to block 522 and attempt to automatically resolve the exception again.

If it is determined that the exception has been resolved, the data logging at the node for which the source of the cause of the exception was identified may be reduced and/or terminated back to its normal state, as in 526, and the process completes, as in 528.

In other implementations, rather than correcting the exception, verifying that the implemented correction has resolved the exception and then reducing logging of data in the node that was the source of the cause of the exception, once the cause of the exception is identified the logging may be automatically reduced before the cause of the exception is corrected. For example, if the cause of the exception is something that is identifiable but not immediately correctable, the logging may be reduced once the cause of the exception is identified. At some later point the cause of the exception may be corrected. In such an implementation, once the cause of the exception is corrected, the logging of data at the node that was the source of the cause of the exception may be increased and monitored to verify that the implemented correction has resolved the exception, as in 524.

Various operations of a monitoring service, such as those described herein, may be executed on one or more computer systems, interacting with various other devices in a network, according to various implementations. One such computer system is illustrated by the block diagram in FIG. 7. In the illustrated implementation, a computer system 700 includes one or more processors 710A, 710B through 710N, coupled to a non-transitory computer-readable storage medium 720 via an input/output (I/O) interface 730. The computer system 700 further includes a network interface 740 coupled to an I/O interface 730, and one or more input/output devices 750. In some implementations, it is contemplated that a monitoring service may be implemented using a single instance of the computer system 700, while in other implementations, multiple such systems or multiple nodes making up the computer system 700 may be configured to host different portions or instances of a monitoring service. For example, in one implementation, some data sources or services may be implemented via one or more nodes of the computer system 700 that are distinct from those nodes implementing other data sources or services.

In various implementations, the computer system 700 may be a uniprocessor system including one processor 710A, or a multiprocessor system including several processors 710A-710N (e.g., two, four, eight, or another suitable number). The processors 710A-710N may be any suitable processor capable of executing instructions. For example, in various implementations the processors 710A-710N may be general-purpose or embedded processors implementing any of a variety of instruction set architectures (ISAs), such as the x86, PowerPC, SPARC, or MIPS ISAs, or any other suitable ISA. In multiprocessor systems, each of the processors 710A-710N may commonly, but not necessarily, implement the same ISA.

The non-transitory computer-readable storage medium 720 may be configured to store executable instructions and/or data accessible by the one or more processors 710A-710N. In various implementations, the non-transitory computer-readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer-readable storage medium 720 as program instructions 725 and data storage 735, respectively. In other implementations, program instructions and/or data may be received, sent or stored upon different types of computer-accessible media, such as non-transitory media, or on similar media separate from the non-transitory computer-readable storage medium 720 or the computer system 700.

Generally speaking, a non-transitory, computer-readable storage medium may include storage media or memory media such as magnetic or optical media, e.g., disk or CD/DVD-ROM coupled to the computer system 700 via the I/O interface 730. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 740.

In one implementation, the I/O interface 730 may be configured to coordinate I/O traffic between the processors 710A-710N, the non-transitory computer-readable storage medium 720, and any peripheral devices in the device, including the network interface 740 or other peripheral interfaces, such as input/output devices 750. In some implementations, the I/O interface 730 may perform any necessary protocol, timing or other data transformations to convert data signals from one component (e.g., non-transitory computer-readable storage medium 720) into a format suitable for use by another component (e.g., processors 710A-710N). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 730, such as an interface to the non-transitory computer-readable storage medium 720, may be incorporated directly into the processors 710A-710N.

The network interface 740 may be configured to allow data to be exchanged between the computer system 700 and other devices attached to a network, such as other computer systems, or between nodes of the computer system 700. In various implementations, the network interface 740 may support communication via wired or wireless general data networks, such as any suitable type of Ethernet network. For example, the network interface 740 may support communication via telecommunications/telephony networks such as analog voice networks or digital fiber communications networks, via storage area networks such as Fibre Channel SANs, or via any other suitable type of network and/or protocol.

Input/output devices 750 may, in some implementations, include one or more display terminals, keyboards, keypads, touchpads, scanning devices, voice or optical recognition devices, or any other devices suitable for entering or retrieving data by one or more computer systems 700. Multiple input/output devices 750 may be present in the computer system 700 or may be distributed on various nodes of the computer system 700. In some implementations, similar input/output devices may be separate from the computer system 700 and may interact with one or more nodes of the computer system 700 through a wired or wireless connection, such as over the network interface 740.

Figure 7:
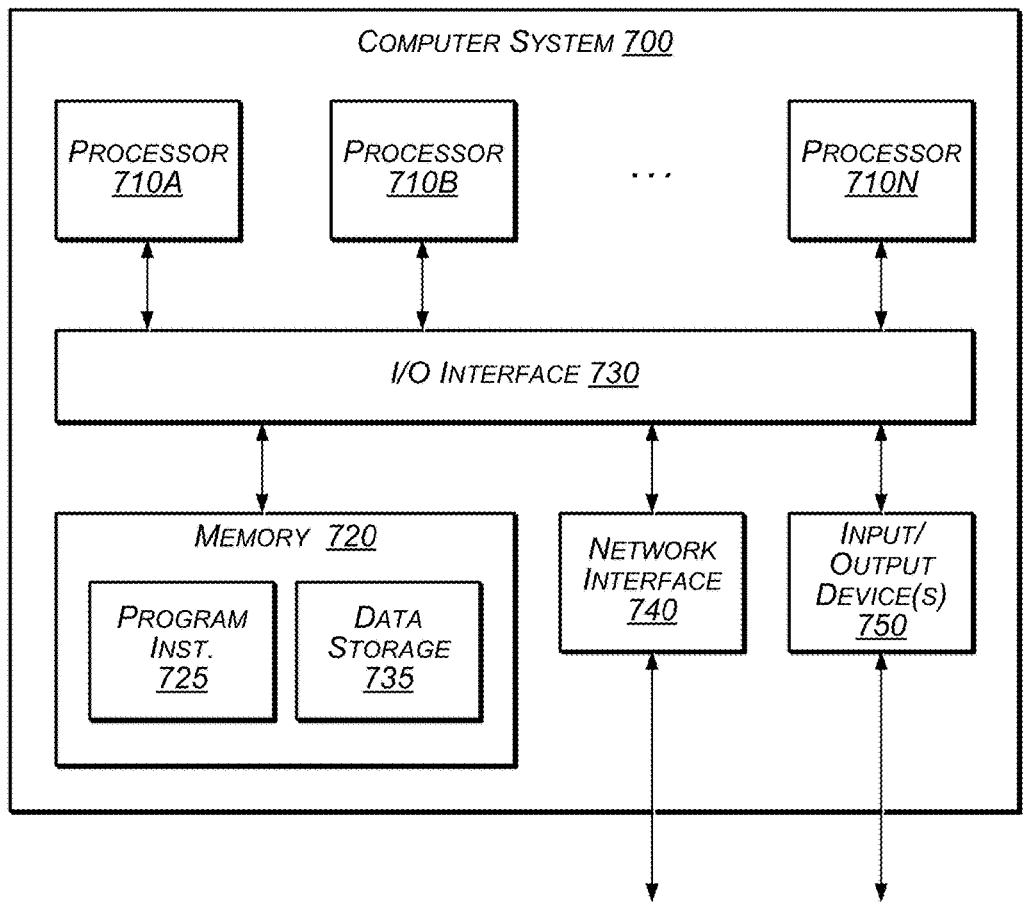
FIG. 7 is a block diagram illustrating an example computer system configured to implement one or more of the systems or processes described herein.

As shown in FIG. 7, the memory 720 may include program instructions 725 which may be configured to implement a monitoring service and data storage 735, which may comprise various tables, data stores and/or other data structures accessible by the program instructions 725.

Users may interact with the monitoring service (and/or various components thereof) in various ways in different implementations. For example, some users may have physical access to the computing system 700, and if so, may interact with various input/output devices 750 to provide and/or receive information. Alternatively, other users may use client computing systems to access the monitoring service and/or its constituent components, such as remotely via the network interface 740 (e.g., via the Internet and/or the World Wide Web). In addition, some or all of the monitoring service may provide various feedback or other general types of information to users (e.g., in response to user requests) via one or more input/output devices 750.

Those skilled in the art will appreciate that the computing system 700 is merely illustrative and is not intended to limit the scope of implementations. In particular, the computing system and devices may include any combination of hardware or software that can perform the indicated functions, including computers, network devices, internet appliances, PDAs, wireless phones, etc. The computing system 700 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that in some implementations the functionality provided by the methods and systems discussed above may be provided in alternative ways, such as being split among more software modules or routines or consolidated into fewer modules or routines. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer-readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method for adaptive monitoring of a network having a plurality of connected processes, comprising:
    monitoring the network for an occurrence of an event, wherein the event corresponds to an expected delivery time of a package to a destination;
    determining that the event exceeds a monitoring threshold, wherein the monitoring threshold relates to a probability as to whether the package will reach the destination by the expected delivery time;
    identifying a first process with an exception related to the event;
    automatically increasing a data logging for a plurality of processes connected to the first process;
    identifying a second process of the plurality of processes with the exception related to the event;
    automatically reducing the data logging of the plurality of processes other than the identified second process;
    determining that the second process is a source of the exception;
    determining a cause of the exception;
    correcting the cause of the exception;
    verifying that the exception is resolved; and
    automatically reducing the data logging for the second process.

2. The computer-implemented method of claim 1, wherein the exception is at least one of a data store commit failure, a data store insert failure, or a data store read failure.

3. The computer-implemented method of claim 2, wherein the cause of the exception is at least one of an insufficient data store memory, an unauthorized user request, an incorrect data field in a data store, a hardware failure, or a connectivity failure.

4. The computer-implemented method of claim 1, wherein the package is a physical package for a physical item.

5. The computer-implemented method of claim 1, wherein the package is a data package.

6. The computer-implemented method of claim 1, wherein correcting the cause of the exception is done automatically.

7. A non-transitory computer-readable storage medium storing instructions for monitoring a network having a plurality of connected nodes, the instructions when executed by a processor causing the processor to:
 at each of a first plurality of nodes within the network, log data at a first rate;
 identify an event within the network that exceeds a monitoring threshold;
 based at least in part on the logged data, identify a first node that includes a first exception related to the event;
 at each of a second plurality of nodes connected to the first node, automatically increase a data logging from the first rate to a second rate;
 identify, based at least in part on the logged data at the second rate, a second node of the second plurality of nodes with a second exception related to the event;
 automatically decrease from the second rate to the first rate the data logging for each of the second plurality of nodes other than the second node of the second plurality of nodes;
 correct a cause of the event; and
 decrease from the second rate to the first rate the data logging for the second node.

8. The non-transitory computer-readable storage medium of claim 7, wherein at least one of the second plurality of nodes is a process.

9. The non-transitory computer-readable storage medium of claim 7, the instructions when executed by the processor further causing the processor to:
 determine if the second node is a source of the cause of the event; and
 if it is determined that the second node is not the source of the cause of the event:
  identify a third plurality of nodes connected to the second node;
  at each of the third plurality of nodes connected to the second node, automatically increase a data logging from the first rate to the second rate;
  identify a third node with a third exception related to the event;
  automatically decrease from the second rate to the first rate a data logging for each of the third plurality of nodes other than the third node; and
  determine that the third node is the source of the cause of the event.

10. The non-transitory computer-readable storage medium of claim 9, wherein the data logging for at least a portion of the third plurality of nodes is increased from the first rate to the second rate in response to identifying the first node at a first layer that includes the first exception related to the event.

11. The non-transitory computer-readable storage medium of claim 7, wherein the cause of the first exception is at least one of an insufficient data store memory, an unauthorized user request, an incorrect data field in a data store, a hardware failure, or a connectivity failure.

12. The non-transitory computer-readable storage medium of claim 7, wherein the first exception is a data store commit exception.

13. The non-transitory computer-readable storage medium of claim 7, wherein the event is a probability that a package will not be delivered by an estimated time.

14. The non-transitory computer-readable storage medium of claim 7, wherein the cause of the event is corrected without involvement of an operator.

15. The non-transitory computer-readable storage medium of claim 7, wherein the event and the first exception are the same.

16. The non-transitory computer-readable storage medium of claim 7, the instructions when executed by the processor further causing the processor to:
 determine that the cause of the event cannot be corrected automatically; and
 provide to an operator the cause of the event and at least a portion of the data logged at the second node.

17. The non-transitory computer-readable storage medium of claim 7, wherein at least one node of the second plurality of nodes is not directly connected to the first node.

18. The non-transitory computer-readable storage medium of claim 7, the instructions when executed by the processor further causing the processor to:
 determine, based at least in part on the data logged at the second node, a cause of the event.

19. A computing system, comprising:
 one or more processors; and
 a memory coupled to the one or more processors and storing program instructions that when executed by the one or more processors cause the one or more processors to:
  monitor a network for an event;
  determine that the event exceeds a monitoring threshold;
  automatically initiate additional data logging at each of a plurality of nodes within the network;
  identify a node of the plurality of nodes that is a source of a cause of the event;
  automatically reduce the additional data logging at each of the plurality of nodes other than the node of the plurality of nodes that is the source of the cause of the event;
  correct the cause of the event; and
  automatically terminate the additional data logging at the node that is the source of the cause of the event.

20. The computing system of claim 19, the program instructions that when executed by the one or more processors further causing the one or more processors to:
 prior to automatically terminating the additional data logging at the node that is the source of the cause of the event, verify that the cause of the event has been corrected.

21. The computing system of claim 20, the program instructions that when executed by the one or more processors further causing the one or more processors to:
 remove from storage at least a portion of the data logged in response to verifying that the cause of the event has been corrected.

22. The computing system of claim 19, wherein the computing system communicates with a plurality of computing systems distributed throughout the network, the plurality of computing systems in communication with one or more nodes of the network.

23. The computing system of claim 19, wherein correcting the cause of the event occurs after automatically terminating the additional data logging at the node that is the source of the cause of the event.

24. The computing system of claim 23, the program instructions that when executed by the one or more processors further causing the one or more processors to:
    subsequent to correcting the cause of the event,
        automatically initiate additional data logging at the node that is the source of the cause of the event;
        verify that the event has been corrected; and
        automatically terminate the additional data logging.

\* \* \* \* \*